INVENTOR
WILLARD R. CALVERT Sr.
BY Frank A. Lukasik
     O. E. Hodges
           ATTORNEYS United States Patent Office 3,498,024
Patented Mar. 3, 1970

3,498,024
METHOD AND APPARATUS FOR GAS
DECONTAMINATION
Willard R. Calvert, Sr., 809 Teakwood Drive,
Severna Park, Md. 21146
Filed Mar. 26, 1968, Ser. No. 716,157
Int. Cl. B01d 53/04
U.S. Cl. 55—33         10 Claims

ABSTRACT OF THE DISCLOSURE

Gas separation arrangement enabling decontamination of gases containing moisture with decontaminating gases and vapors, the arrangement having a cyclically regenerative adsorbent bed contained within a housing. A plurality of heat exchange separators is disposed in such relation to the adsorbent bed that heat transfer from the bed during adsorption is efficient preventing gaseous re-contamination due to accumulation of heat of adsorption, and that heat transfer to the bed during desorption is efficient enabling rapid release of desorbates to disposal.

---

The invention described herein may be manufactured and used by or for the Government of the United States of America for governmental purposes without the payment of any royalties thereon or therefor.

BACKGROUND OF THE INVENTION

The present invention relates generally to an adsorption chamber for decontaminating a feed gas mixture such as air and more particularly to a novel construction of an adsorption chamber providing efficient and uniform heat transfer to and from an adsorbent bed during adsorption and desorption.

Air purification is important in maintaining the enclosed and independent atmosphere of submarines, space ships, etc. wherein air is reused through an indefinite time. In submarines, various materials are emitted into the air from men, materials, and machines. These contaminating materials must be separated and removed from the air to disposal, and this makes the air clean. Clean air is essential to ventilation, and inhabited atmospheres must be ventilated, otherwise the contaminations will accumulate intolerably. The problem includes air conditioning which adjusts pressure, temperature, moisture content, oxygen replenishment rate and distribution rate to satisfy the requirements of a variety of air quality specifications. It is also important, in the gas separation process to preserve the gases such as $O_2$ and $N_2$ where losses due to processing must be replaced from storage. Gas separations can be precisely controlled of the adsorption variables are understood. Failure to understand the effects that variable have on the adsorption process has limited the objectives of prior art adsorption systems. The heat of adsorption effects contributing to inefficient and incomplete decontamination have been neglected. Failure of some prior art systems has been explained by the assumption that the removal of $CO_2$ from breathing air necessarily requires that moisture be removed first, to allow a maximum capacity for the $CO_2$ adsorption and removal to purify the air. A feature of the present invention is the retention of moisture in the gas or mixture thereof to be decontaminated, said moisture being limited or held constant during input to an adsorption chamber and removed during adsorption with efficient heat removal by transfer.

SUMMARY

The general purpose of this invention is to provide an air purifying gas separation arrangement advantageously having efficient heat removal during adsorption of gases and vapors. Benefits are provided by: efficient heat removal during adsorption to prevent re-contamination due to liberation of heat during the addition of measured amounts of water to the adsorbent during a first desorption to conserve $O_2$ and $N_2$; efficient heat transfer into the adsorbent bed during a second and regenerative desorption and during subsequent activation; and subsequent heat removal during cooling to prepare the adsorbent for re-use. The adserbent bed is contained within a housing formed from a suitable structural material. Liquid cooled walls are arranged to rapidly and uniformly remove heat from the adsorbent bed by conduction, radiation, and convection over short and rather uniform distances through air and adsorbent particles which are poor heat conductors.

During adsorption, conduit means carry contaminated air under feed pressure to a space beneath a perforate grid which supports the adsorbent bed while distributing the contaminated air uniformly over the cross-sectional area of the bottom of the bed. As the contaminated air flows upwardly, through active adsorbent, $O_2$, $N_2$ and C—H—O gases are separated from $CO_2$, moisture and contaminants which may be present. Gases which precede $CO_2$ in chromatographic sequence emerge from the adsorbent bed while the $CO_2$ and other contaminants and moisture are retained. Any other terminus gas may be chosen in place of the $CO_2$, and may be used in the same way.

An object of the present invention is to provide a selective adsorption apparatus of improved heat transfer efficiency, simplicity and having a long life.

Another object is to provide apparatus for use in controlling the quality of air from breathing and other air functions.

A still further object of this invention is the separation of minor amounts of gases and other gas-carried substances from a major amount of other gases.

A still further object is to provide improved separation and removal of contaminating substances from an atmosphere.

BRIEF DESCRIPTION OF THE DRAWINGS

The exact nature of this invention, as well as other objects and advantages thereof, will be readily apparent from consideration of the following specification related to the annexed drawings in which.

DESCRIPTION OF THE PREFERRED EMBODIMENT

Figure 1:
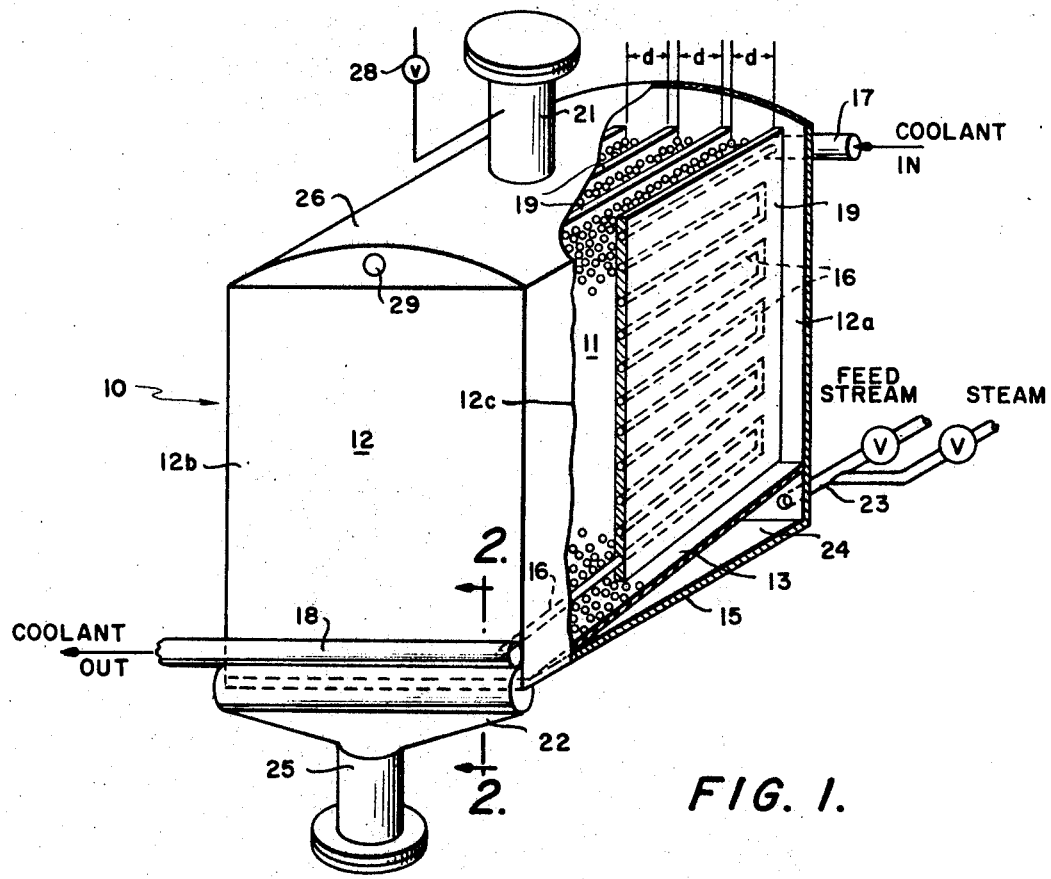
FIG. 1 shows a preferred embodiment of the invention.

A preferred embodiment of a gas separation apparatus which illustrates the present invention is shown in FIG. 1. The adsorbent bed 11 is contained within a housing 12 formed from a suitable structural material. The nature and particle size of the adsorbent materials will be later described in greater detail. The adsorber unit 10, is provided with grid-support 13 which is sloping downward from end wall 12a to open slot 14 which is between end wall 12b and grid 13 at the line where a grid support 13 contacts bottom 15 of the housing. Housing 12 is cutaway at 12c to show internally a conduit 16 which carries coolant fluid from upper header 17 to lower header 18. Coolant fluid flows toward end wall 12b where it is reversed to continue flow in the extension of conduit 16 wherein it flows toward end wall 12a. Repeated reversing and extended flowing through conduit 16 eventually conveys the coolant to header 18 supported on the bottom of end wall 12b.

Within housing 12 is a plurality of spaced apart upstanding walls 19, each of which has internal passages 16 therein to carry coolant fluid internally. The adsorbent particles forming coolant bed 11 are supported vertically between walls 19, thus forming individual beds of thickness $d$. The ends of each narrow individual bed of adsorbent particles are supported by vertical walls 12a and 12b of the housing 12.

Housing 12 is filled with adsorbent particles via an inlet 21 to form the adsorbent bed 11. For monitoring purposes, thermocouples (not shown) may be imbedded in adsorbent bed 11. An outlet 22 provides means for emptying the housing 12 of adsorbent particles. A pressurized feed stream of contaminated gas, such as air flows through a conduit 23 into a wedge shaped distributor space 24 formed by the grid support 13 and the housing bottom 15. The slope of grid support 13 is such that the adsorbent particles in adsorbent bed 11 will flow by gravity through slot 14 toward outlet 22 when conduit 25 is opened. The openings or slots in grid support 13 are small enough to prevent adsorbent particles from sifting through the numerous enough to permit a free flow of gas.

The uniformly distributed stream collected in the wedge shaped space 24 flows upwardly into and through adsorbent bed 11, wherein the stream becomes separated chromatographically by the adsorbent bed 11. The first part of the gases emerging from the adsorbent is the product effluent from adsorption treatment. When an undesired contaminant (terminus gas) begins to appear in the product effluent, adsorption may be terminated by manual or automatic means of any suitable design. The termination is based upon observation of the terminus gas by monitoring devices.

The product effluent, that is, gases decontaminated by adsorption, for example, collects at the top of the housing 12 beneath a cover 26 and flows outwardly through a filter screen (not shown) of any suitable well known design and through an outlet aperture 29 to further treatment, or so subsequent use as desired. The moisture and the minor gases and vapors retained in the adsorbent bed 11 after termination of adsorption, comprises the second part of the gases emerging from the adsorbent and which emerge during desorption (a part of regeneration). Regeneration may be accomplished in the adsorber unit 10 shown in FIG. 1 in a manner described below, or in a regeneration chamber of similar construction having, for example, electrically heated resistance wires within wall 19.

For regeneration employing the apparatus of the preferred embodiment, a hot fluid is supplied to conduits 16 to heat the walls 19. Since it is only necessary that the adsorbent be heated to be regenerated in the presence of a contaminant carrier, the adsorbent may be transferred from a cooled chamber to a heated chamber to start a desorption operation.

Figure 2:
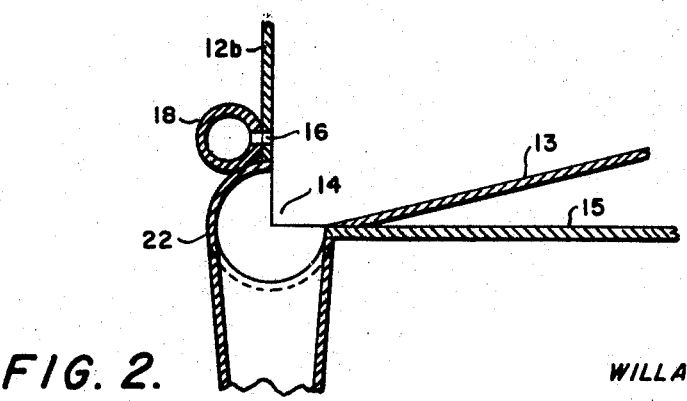
FIG. 2 shows a cross-section of FIG. 1 at 2—2.

Adsorption apparatus such as shown in FIGS. 1 and 2 accept and treat the contaminated air stream at design-determined flow-rates until the capacity of the adsorbent has been reached. The size and capacity of the adsorbent bed is calculated to satisfy the time period permitted for adsorption in the scheduled cycles of operation. Preferably, a sensor (not shown) or gas detector of any suitable well known design is utilized to detect and signal the appearance of a major contaminant (terminus gas) in the effluent flowing from the adsorbent bed 11. The sensor signal may be used to terminate the adsorption phase and to switch the direction of flow of the pressurized stream into a second adsorber (not shown) to enable air purification flow to continue. Because a variable input amount of gaseous contaminations may appear, the time-period of adsorption may vary accordingly, inversely to the amount of contamination.

Figure 3:
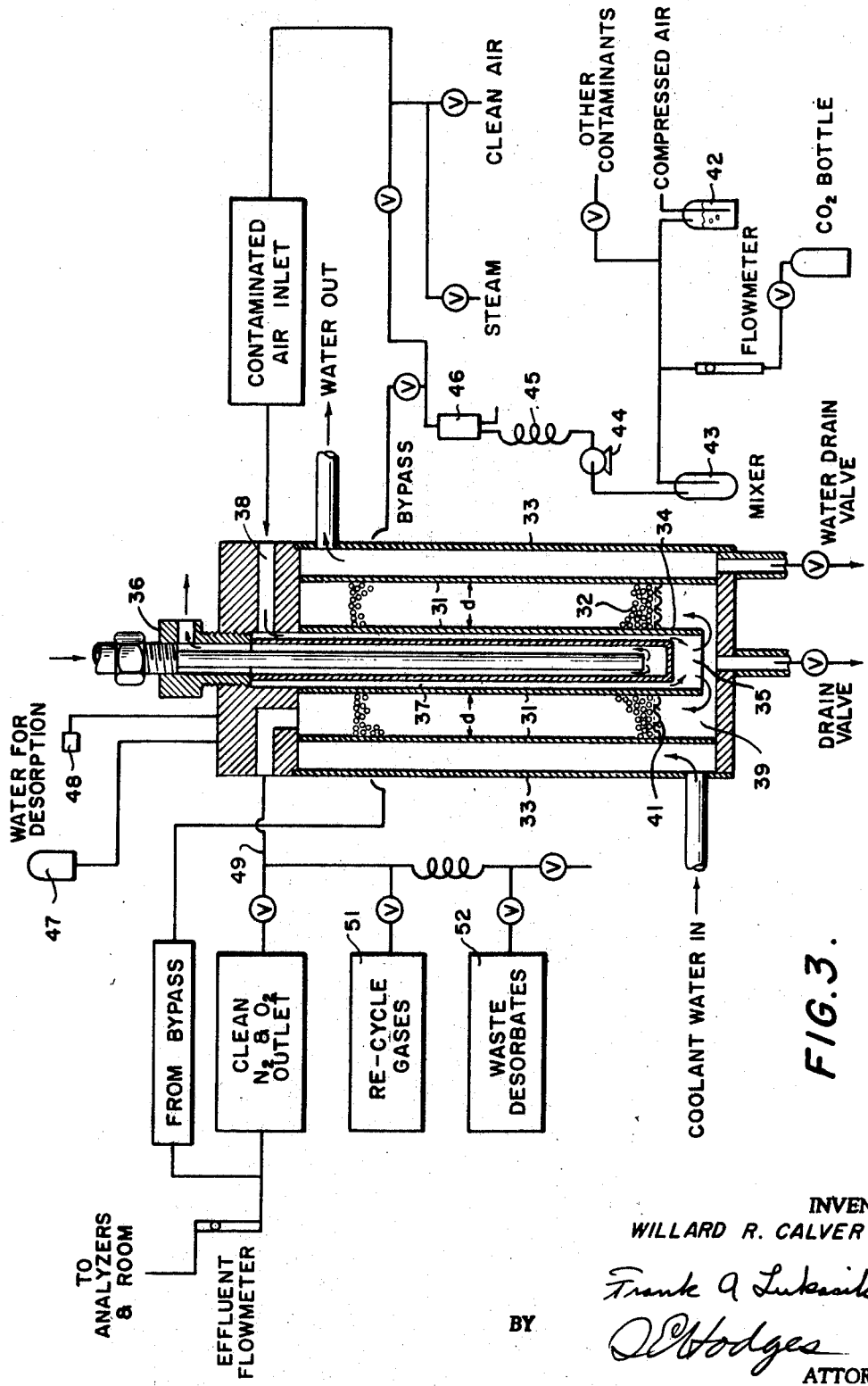
FIG. 3 shows an alternative embodiment of the invention and a flow diagram of a test arrangement.

By way of example, the embodiment of FIG. 3, when placed in a test environment, emphasizes and advantageous effects of practicing a form of the invention in relation to the prior art. Comparisons at low and high percent relative humidity (percent RH) showed that presence of moisture in the feed air is not a hindrance. Furthermore, it was found that the depth of the adsorbent bed, length of flow path through adsorbent is not a critical factor when removal of the heat of adsorption is adequate. For example, comparison between two beds 4.3 and 8.2 inch depth with feed air supplied at the two bed depths at high and low (percent RH) levels and with provision of heat removal in both instances results in essentially similar levels of decontamination, and similar contaminant removal capacities per unit of adsorbent weight.

Adsorption with heat removal should precede adsorption with heat accumulation, (catalytic oxidation) to remove certain adverse contaminants, otherwise the catalytic adsorbents may be adversely damaged by reaction products which change adsorbent characterstics. Such adverse contaminants are those which decompose when heated to become acidic and/or reactive, e.g. refrigerant gases. In contrast to the importance of heat removal to the adsorption process of this invention, the importance of heat retention to the catalytic oxidation process is discussed in U.S. Patent No. 3,176,461 by W. R. Calvert. For example, when the ratio of wall area to adsorbent mass is large, a slight heat loss through the chamber wall may quench the delicate reaction.

Any suitable process may be used to regenerate the adsorbent bed 11, such as, for example, a process similar in principle to that described in copending U.S. application Ser. No. 708,359 entitled "Regeneration Process" by Willard R. Calvert and James N. Little and filed Feb. 26, 1968.

In carrying out desorption with respect to the embodiment of FIG. 1, an aqueous solution is first added to the adsorber unit 10 through valve and conduit 28. The gases such as $O_2$ and $N_2$ emerge and flow outwardly through aperture 29 and into further treatment or disposal as desired. Next, steam is injected through conduit 23 at low pressure for distribution across grid 13 and thereafter flowing upward through grid 13 and through the adsorbent bed 11. Heating of the walls 19 then liberates vapors from the wet adsorbent particles until the heating has boiled off the water, the amine contained in aqueous solution and other adsorbed gases and vapors. Further heating is required to remove adsorbed moisture and water of hydration from within the adsorbent's crystalline structure and to remove substances which were collected by filtration and adsorption which could not be removed by desorption but may be burned off. To accomplish this last-mentioned step, steam flow through conduit 23 is stopped, and clean air or effluent from adsorption, is fed through conduit 23, thus forcing the high temperature effluent outwardly through aperture 29 into a catalytic oxidation reactor (not shown) of any suitable construction for further treatment. Heat from the walls 19 must be controlled to elevate the adsorbent bed 11 temperature to about 650° F. during air flow. Activation, the second part of the regeneration, of the adsorbent bed 11 is then complete. After subsequent cooling, the adsorbent may again be employed for further adsorption in the next cycle of operations.

Two or more chambers of the type shown in FIG. 1 may be joined in series so that adsorbent particles may flow by gravity from an upper chamber acting as an adsorption phase to a lower chamber acting as a desorption phase.

FIG. 3 shows an adsorption chamber embodiment of the invention alternative to that of FIG. 1 and, further, illustratively incorporated in a system providing adsorption with heat removal means to provide testing of such adsorption.

In the adsorption chamber version of FIG. 3, relatively uniform and efficient heat transfer is provided in a cylindrical arrangement of heat transfer surfaces. Internal cylindrical wall 31 provides heat transfer surfaces for an adsorbent bed 32 annular in transverse cross section. Jacket-forming walls 33 enclose the chamber so that between wall 31 and 33 fluid coolant may be circulated. A tube 34 centrally disposed of the jacket and having an open end 35 provides an additional heat transfer surface so that the differential distances between different particles and heat transfer surfaces is substantially reduced in accordance with the invention. Tube 34 receives a bayonet type element 36 which may provide cooling or heating for adsorption or desorption as desired. Between the bayonet element 36 and the tube 34 there is an annular space 37 which serves as a conduit. During adsorption, conduit 37 carries the contaminated air from inlet 38 to a space 39 beneath perforate grid 41 which supports the weight of the adsorbent bed 32 thereby enabling distribution of the contaminated air uniformly over the cross-sectional area of the bottom of annular bed 32. Adsorption continues in the same manner as described in connection with the embodiment of FIG. 1.

In terms of fluid flow, FIG. 3 shows air entering from a compressed air supply, and being humidified in a water bubbler 42 at 6 p.s.i.g. and 75° F. As a test contaminant, for example, $CO_2$ is shown added and mixed into the stream in a mixer 43 of any suitable well known construction. After passing through a compressor 44, cooler 45 and condensate separator 46, the contaminated air stream remains saturated with water vapor. Tank 47 provides water for the first displacement step of the desorption process. Thermocouple junction 48 is connected to thermocouples (not shown) located within the adsorbent bed 32 to provide an accurate readout of the temperature of the center of the adsorbent bed 32.

EXAMPLE

An example of an embodiment of the invention as shown in FIG. 3 is as follows:

Adsorbent 13× aluminosilicate MS 544, 0.085 inch diameter spheres; Product of W. R. Grace and Co., Davison Chemical Division, Baltimore, Md.

Bayonet heater: Cartridge type, 5/8-inch diameter x 9½ inches long; 240 volts, 1500 watt rating, used at 100 volts.

Activation: at 650° F. with 1 c.f.m. compressed air purge.

Steam supply: 30 p.s.i.g. steam from a generator at 25 cc./minute condensate rate to 400 cc. condensate per lb. adsorbent.

The coolant jacketed wall area formed by walls 31 and 33 of 35.2 sq. in., contained a 0.5 lb. bed of MS 544 adsorbent. An inner annulus wall 31 provided additional cold wall area of 10.0 sq. in. which was cooled indirectly by transfer through a .020 inch air gap 37 to a bayonet cooler 36. Chilled coolant water flowed through the outer jacketed wall and the bayonet cooler to collect and remove heat. A total of 45.2 sq. in. of cold wall area was provided to the 0.5 lb. bed of adsorbent which had a volume of 21.7 cu. in.

Figure 4:
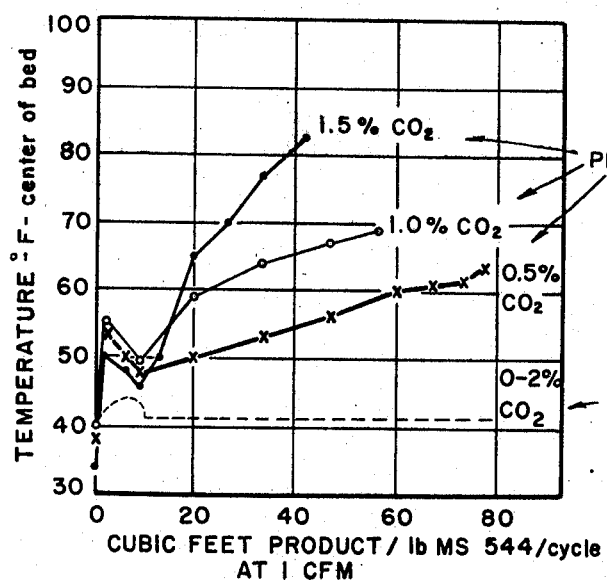
FIG. 4 shows temperature profiles of the interior of an adsorbent bed.

During adsorption at 30 p.s.i.g., the temperature at the middle of the bed was recorded, finding temperature profiles shown in FIG. 4. With chilled water flowing through the jacket 33 at 0.66 l.p.m., and through the bayonet 36 at 0.44 liters per minute, the curves become level according to the cooling rate as related to the rate of release of the heat adsorption. As the percent $CO_2$ increases, the heat release rate increases and the cooling is less effective. The 0.5% $CO_2$ profile most closely approaches the desired results of horizontal level line flatness and shows 78 cu. ft. adsorption cleaned air effluent produced by one lb. MS 544 during one adsorption period. One hundred lbs. (2½ cu. ft.) adsorbent cycled per hour, therefore, produces about 7800 cu. ft. clean air per hour.

Thus, FIG. 4 illustrates various unacceptable situations depicted by the sloping curves that would be present in the prior art. The poor level flatness of these curves indicate that the distance of some of the adsorbent particles in FIG. 3 from the cooling walls 31 is greater than is necessary for best horizontal level line flatness and that the cold wall area is insufficient. The levelness of these curves could be improved which mean the removal of heat of adsorption could be improved by decreasing the particle bed thickness and/or increasing the surface area of the heat exchange plates.

The flow schematic of FIG. 3 further shows product effluents $O_2$, $N_2$, etc., passing through conduit 49, to analysis, and then to the room. Recycle gases and wastes are collected separately in well known legended testing equipment included in flow diagram steps 51 and 52 which symbolize the steps in the process for analysis and disposal. Pressure release gases (30 to 0 p.s.i.g.) are the same composition as the effluent in this adsorption system and are included therein. While slowly adding water from tank 47 to saturate the adsorbates-loaded adsorbent bed, and while cooling, a first desorbate fraction is collected. Since this fraction includes an amount of $CO_2$ along with $N_2$ and $O_2$, it must be recycled through active adsorbent for further separation, as indicated by flow diagram step 51 if conservation of the $N_2$ is desired. Otherwise, two desorptions are not necessary and all desorbates become wastes and are led to waste disposal as symbolized by flow diagram step 52.

At the start of adsorption, the effluent temperature is the same as all mass temperatures within the adsorption chamber. As moisture is adsorbed the effective mass of the adsorption zone becomes moisture laden and the zone enlarges moving downstream. Heat of adsorption is generated by the adsorption of moisture and this heat may release $CO_2$ which had previously been adsorbed by particles located downstream from the moisture zone. The heat of adsorption generated by the adsorption of $CO_2$ may also release carbon monoxide, oxygen, nitrogen and hydrogen which had previously been adsorbed by particles located downstream from the $CO_2$ adsorption zone. Thus, each gas is adsorbed in its respective zone and can release gases previously adsorbed by particles located downstream from its zone due to heat release and due to displacement.

The input of contaminating wastes to the adsorbent can be expressed by the difference $(Wf-We)$ where $(Wf)$ is the pounds/flow rate of the feed stream multiplied by the total wastes concentration and $(We)$ is the pounds/flow rate of the effluent stream multiplied by the residual wastes concentration after adsorption. The Heat Product $(Hp)$ may be calculated from the Heat of adsorption $(H)$ where:

$$H = \text{Heat of wetting} + \begin{array}{c}\text{Latent heat}\\\text{of wastes}\\\text{(vaporization}\\\text{or condensing}\\(H_{L_1})\end{array} = \begin{array}{c}\text{Latent heat}\\\text{of wastes}\\\text{including}\\\text{water}\\(HL)\end{array} = \begin{array}{c}\text{B.t.u./lb.}\\\text{wastes and}\\\text{water}\end{array}$$

then, $Hp = (Wf - We)XH = $ B.t.u.

The product heat is distributed to the following, resulting in heat content increase $(dH)$ as follows:

$dH_a$ of the lbs. air flowing $dH_{sa}$ of the lbs. adsorbent downstream $dH_L$ of the lbs. wastes vaporized and carried by the stream, and $dH_t$, the heat transferred through the chamber wall to a carrier outside that wall Therefore, when heat is not removed during adsorption, $Hp$ wastes $= dH_a + dH_{sa} + dH_L + dH_t$. Ideally, $Hp = dH_t$, according to the invention, when heat is efficiently removed from the sites where it is generated.

The heats discussed above result in temperature increases in the respective masses according to their specific heats (and latent heats) with heat flowing away from the adsorption zone by convection and radiation and by conduction through adsorbent and air to the walls. The apparatus of this invention markedly increases overall efficiency of heat removal by decreasing the distance of the heat transfer path, through poor conductors such as the refractory-like adsorbent, and air.

Figure 5A:
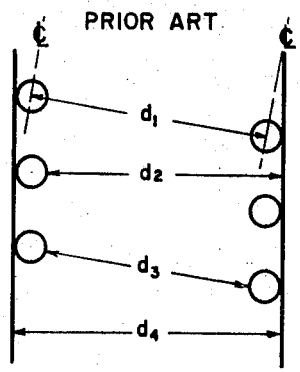
FIG. 5a and 5b show a comparison of distances.
Figure 5B:
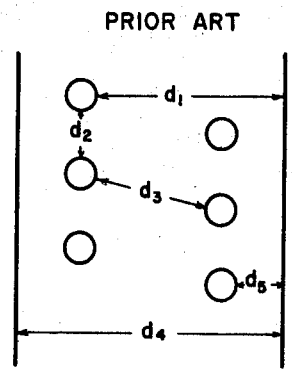

The use of cooling coils for heat transfer, with the coils imbedded within the adsorbent is well known. However, the prior art devices as shown in FIGS. 5a and 5b, do not provide efficient heat dissipation. For example, distances of tube-on-wall construction shown in FIG. 5a are more uniform than an imbedded helix tube shown in FIG. 5b. Furthermore, in the rectangular configuration of this invention, FIG. 1, the distances are more uniform as shown in FIG. 6a, while the chamber contains the same volume and height of adsorbent between the walls as, for example, the chamber of FIG. 3.

Figure 6A:
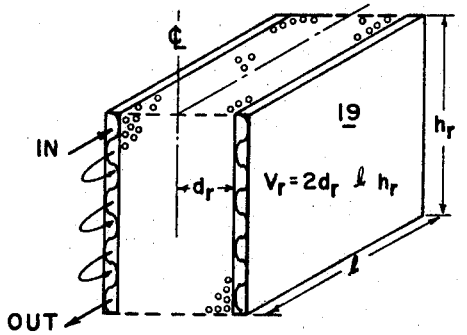
FIGS. 6a and 6b illustrate coolant flow.
Figure 6B:
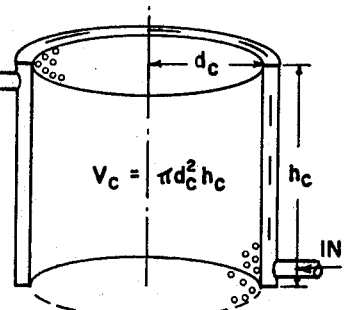

FIGS. 6a and 6b, respectively, show rectangular and cylindrical adsorbent chambers in cross section to illustrate coolant flow. The volumes of the chambers can be expressed:

$V_r = 2d_r \times L \times h_r$ and
$V_c = \pi d_c^2 h_c$

Where $V_r = V_c$ and $h_r = h_c$ and
Where $d_r$ or $d_c$ is the greatest distance of a particle from a wall, then $d_c$ may be greater than $d_r$. And $d_r$ can be made smaller by increasing length L while volume remains constant.

In FIG. 6a, the flat conduit walls 19 provide additional heat transfer uniformity by distributing coolant flow uniformly over the adsorbent containing conduit wall as shown by the arrows. In FIG. 6b, the simple jacketed wall, or tube and shell, configuration as shown does not provide as uniform nor as even a distribution of flow as the arrangement of FIG. 6a.

Examples of the ranges of dimensions which may be used in terms of apparatus arranged in accordance with the preferred embodiment of FIG. 1 for both adsorption and desorption are as follows: The effective cooling wall area per amount of adsorbent by weight and approximate volume is 53 to 107 sq. in. per pound of adsorbent (700 cc.); the thickness of the adsorbent bed (dimension d in FIG. 1) is about 0.4 to about 0.8 inch. In an expanded range of dimensions which will also provide the necessary functions of the invention, the effective cooling wall area per amount of adsorbent by weight is about 10 to about 426 sq. in. per pound of adsorbent and the thickness of the adsorbent bed (dimension d in FIG. 1) is about 0.1 to about 4.0 inches.

It should be noted that where the phrase "upwardly flowing" has been used in the specification, "downward flow" or flow in another direction would also serve the purpose of the invention. Furthermore, in the example, .085 inch spheres of adsorbent MS 544 were used. Other types of adsorbents, or a mixture of adsorbents, whether in spherical, granular or powder form would also serve the purpose of the invention even though the capabilities or capacities of the adsorbent may vary significantly from the capabilities of the type described above.

Obviously many modifications and variations of the present invention are possible in the light of the above teachings. It is therefore to be understood that, the invention may be practiced otherwise than as specifically described.

What is claimed is:

1. A method of decontaminating gases comprising the steps of:
   directing a stream of contaminated gases through a bed of adsorbent particles;
   separating adsorbable gases and vapors chromatographically to decontaminate the gases;
   retaining the contaminants within the adsorbent particles thereby producing contaminant burdened particles;
   removing the heat generated by the adsorption of the contaminants within the particles;
   detecting the appearance of a contaminant in the decontaminated gases;
   replacing said particles when contaminants are detected with activated particles; and
   treating said contaminant burdened particles to remove said contaminants therefrom so that they can be reused as activated particles.

2. The method according to claim 1 including the initial step of:
   transforming said stream to a stream under pressure and of essentially constant moisture content.

3. Apparatus for decontamination of gases, comprising:
   housing means having top, bottom and side walls defining a chamber;
   a support means positioned in the bottom of said housing means and thereby defining in conjunction with said side and bottom walls an enclosed gas distribution cavity;
   a gas inlet port disposed within said gas distribution cavity;
   a gas outlet port disposed at the top of said housing means;
   adsorbent particles of solid material for removing contaminants from the gases disposed within and substantially filling said housing means and above said support means;
   a plurality of predeterminedly spaced apart heat exchange plates each having surface of predetermined surface area mounted vertically within said housing means above said support means and which enclose said particles thereby forming at least one particle bed;
   said heat exchange plate surface being adapted for accurately controlling either the removal of heat which is generated by said particles as they become burdened with contaminants during the decontamination of the contaminant gases or the addition of heat to said particles to release the contaminant burdens from said particles;
   an adsorbent particle inlet port disposed at the top of said housing;
   an adsorbent particle outlet port disposed at the bottom of said housing adjacent said support grid;
   means for controlling the flow of said particles through said ports;
   detection means for detecting near said gas outlet port the appearance of a predetermined amount of contaminant present in a gas stream which flows upwards from said gas distribution cavity through said support means and through said particle bed;
   said detection means, upon detecting said predetermined amount of contaminant, actuates said flow control means to open said particles outlet port and allow said particles to move from said chamber, and to close said particle outlet port when all said particles have moved from said chamber; and
   means for opening said particle inlet port upon reclosing of said particle outlet port to thereby allow activated adsorbent particles to replace the contaminant burdened adsorbent particles.

4. The apparatus as defined in claim 3 wherein said plurality of heat exchange plate surfaces are spaced a predetermined distance from each other thereby forming at least one adsorbent particle bed having a predetermined thickness, and said surfaces are of a predetermined area.

5. The apparatus as defined in claim 4 wherein said adsorbent particle bed thickness is approximately 0.4 to 0.8 inches and the effective area of said plate surface is approximately 53 to 107 sq. in. per lb. of adsorbent particle solid material.

6. The apparatus as defined in claim 4 wherein said adsorbent bed thickness is between 0.1 to 4.0 inches and the effective area of said plate surface is between 10 to 426 sq. in. per lb. of absorbent.

7. The apparatus of claim 3 wherein said support means comprises:
a perforate support grid having slots therein which are small enough to prevent adsorbent particles from sifting through and large enough to permit a free flow of gas, said grid being mounted within the housing and positioned above the bottom at an angle to the horizontal thereby forming a wedge-shaped distribution cavity.

8. The apparatus as defined in claim 7 which includes:
a funneling means positioned between said adsorbent particle outlet port and the edge formed by said support grid and said bottom wall which aids in the moving of said adsorbent particles out of said chamber.

9. The apparatus as defined in claim 3 wherein said housing means is cylindrical in shape and includes two cylindrically shaped heat exchange plates of different diameter concentrically positioned within said housing means to define an annular particle bed.

10. The apparatus as defined in claim 3 wherein the amount of heat generated within adsorbent particles during adsorption of contaminants is removed by conduction to cold walls contacting some of the particles with the ratio of heat removal to heat generated being essentially 1 to 1 due to sufficiently short distance through adsorbents, which are poor conductors of heat, and due to wall area sufficient to transfer the conducted heat to external heat disposal.

References Cited

UNITED STATES PATENTS

| | | | |
|---|---|---|---|
| 2,975,860 | 3/1961 | Western | 55—33 X |
| 3,029,575 | 4/1962 | Eng et al. | 55—75 X |
| 3,061,992 | 11/1962 | Russell | 55—75 X |
| 3,150,942 | 9/1964 | Vasan | 55—75 X |
| 3,359,707 | 12/1967 | Jean | 55—33 |

JAMES L. DECESARE, Primary Examiner

U.S. Cl. X.R.

55—386, 389

UNITED STATES PATENT OFFICE
CERTIFICATE OF CORRECTION

Patent No. 3,498,024                                                  March 3, 1970

Willard R. Calvert, Sr.

It is certified that error appears in the above identified patent and that said Letters Patent are hereby corrected as shown below:

Column 1, line 13, "decontaminating" should read -- contaminating --; line 53, "of" should read -- if --; line 55, "variable" should read -- variables --. Column 2, line 10, "adserbent" should read -- adsorbent --; line 34, "from" should read -- for --. Column 3, line 8, "coolant" should read -- adsorbent --; line 25, "the" should read -- and --; line 43, "so" should read -- to --. Column 4, line 2, "and" should read -- the --. Column 5, line 41, "Adsorbent 13" should read -- Adsorbent: 13 --; line 67, after "heat" insert -- of --. Column 6, line 8, "mean" should read -- means --. Column 7, line 67, "of" should read -- for --. Column 8, lines 31 and 36, "surface", each occurrence, should read -- surfaces --.

Signed and sealed this 26th day of January 1971.

(SEAL)
Attest:

EDWARD M. FLETCHER, JR.                        WILLIAM E. SCHUYLER, JR.
Attesting Officer                                    Commissioner of Patents